(12) United States Patent
Barrett et al.

(10) Patent No.: US 9,082,291 B2
(45) Date of Patent: Jul. 14, 2015

(54) VIRTUAL METERING WITH PARTITIONED METROLOGY

(71) Applicant: Itron, Inc., Liberty Lake, WA (US)

(72) Inventors: Gregory Shane Barrett, Hayesville, NC (US); Christophe Fouquet, Alpharetta, GA (US)

(73) Assignee: Itron, Inc., Liberty Lake, WA (US)

( * ) Notice: Subject to any disclaimer, the term of this patent is extended or adjusted under 35 U.S.C. 154(b) by 262 days.

(21) Appl. No.: 13/717,406

(22) Filed: Dec. 17, 2012

(65) Prior Publication Data

US 2014/0167976 A1    Jun. 19, 2014

(51) Int. Cl.
G06F 9/455    (2006.01)
G08C 19/00    (2006.01)
G01D 4/00    (2006.01)

(52) U.S. Cl.
CPC .............. *G08C 19/00* (2013.01); *G01D 4/004* (2013.01); *G06F 9/455* (2013.01); *G06F 9/4552* (2013.01); *G06F 9/45525* (2013.01); *Y02B 90/242* (2013.01); *Y02B 90/246* (2013.01); *Y04S 20/322* (2013.01); *Y04S 20/42* (2013.01)

(58) Field of Classification Search
CPC .................... G07B 2017/00064; G01D 4/004; G01D 4/002; Y02B 90/242; Y02B 90/246; Y04S 20/322; Y04S 20/32; Y04S 20/42; H04L 9/321; G06F 9/455; G06F 9/4552; G06F 9/45525; G06F 2009/45562; G06F 2009/4557; G06F 2009/45587
USPC ............................ 705/63; 340/870.02, 870.11
See application file for complete search history.

(56) References Cited

U.S. PATENT DOCUMENTS

| 4,783,748 A | 11/1988 | Swarztrauber et al. |
| 6,591,229 B1 | 7/2003 | Pattinson et al. |
| 8,613,659 B2 * | 12/2013 | Nelson et al. .................. 463/25 |
| 2002/0120723 A1 | 8/2002 | Forth et al. |
| 2003/0158677 A1 | 8/2003 | Swarztrauber et al. |

(Continued)

FOREIGN PATENT DOCUMENTS

| EP | 1806590 A2 | 7/2007 |
| WO | WO03036874 | 5/2003 |
| WO | WO2010019476 | 2/2010 |

OTHER PUBLICATIONS

U.S. Appl. No. 13/717,576, filed Dec. 17, 2012, Joseph Pontin et al., "Virtual Cluster Meter (VCM)," 51 pages.

(Continued)

*Primary Examiner* — Daniell L Negron
*Assistant Examiner* — Benyam Haile
(74) *Attorney, Agent, or Firm* — Lee & Hayes, PLLC

(57) ABSTRACT

A distributed metering platform virtualizes functions of a conventional metrology sensor and separates the virtualized functions from a metrology sensor. One or more virtual meters or applications may be instantiated at a network communication device that is remote from the metrology sensor and processes metrology data received from the metrology sensor. Each virtual meter may include multiple partitioned application spaces that are isolated from one another. In one example, a first application space includes a locked version of code and a second application space includes an unlocked version of code. Furthermore, each virtual meter may be isolated from other virtual meters such that each virtual meter is unable to affect operations and/or data associated with other virtual meters.

18 Claims, 7 Drawing Sheets

(56) References Cited

U.S. PATENT DOCUMENTS

| | | | |
|---|---|---|---|
| 2004/0122833 A1 | 6/2004 | Forth et al. | |
| 2010/0042372 A1* | 2/2010 | Carter et al. | 702/189 |
| 2011/0316717 A1 | 12/2011 | Young et al. | |
| 2012/0036250 A1 | 2/2012 | Vaswani et al. | |
| 2014/0040343 A1* | 2/2014 | Nickolov et al. | 709/201 |
| 2014/0167981 A1 | 6/2014 | Pontin et al. | |
| 2014/0277783 A1 | 9/2014 | Knuth et al. | |

OTHER PUBLICATIONS

PCT Search Report and Written Opinion mailed Jun. 25, 2014 for PCT Application No. PCT/US13/68223, 14 Pages.

PCT Search Report and Written Opinion mailed Feb. 13, 2014 for PCT Application # PCT/US13/68230.

Office Action for U.S. Appl. No. 13/717,576, mailed on Dec. 26, 2014, Joseph Pontin, "Virtual Cluster Meter (VCM)", 19 pages.

\* cited by examiner

VIRTUAL METERING WITH PARTITIONED METROLOGY

BACKGROUND

With the advent of smart device technology, an increasing number of smart devices are developed and available for use in residential, commercial and industrial purposes. Examples of these smart devices may include, for example, smart utility meters, sensors, control devices, etc. Although these smart devices (e.g., smart utility meters) are highly desirable for a variety of applications (e.g., utility services) due to their versatile and diverse functions, installation and/or upgrade of these smart devices may sometimes face difficulties due to physical and/or legal reasons or limitations. For example, in some locations (e.g., large apartment complexes), a physical space for installing a utility meter may be insufficient to accommodate the utility meter(s). Further, in some instances, certain functionality and/or data of the utility meter may be subject to more stringent requirements than other functionality and/or data. For instance, customers or consumer groups may demand that certain data be treated with a higher level of privacy than others, utility companies may require higher levels of accuracy or completeness for certain data than others, and/or governing bodies may regulate standards by which some data must be treated while not regulating treatment of other data.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

As noted above, installation of a full service utility meter may not always be possible due to physical space constraints. This application describes a distributed metering approach in which metering functionality is split between a metering element (which may have a smaller form factor than a full service utility meter) and a network communication device disposed at a location remote from the metering element. Generally, the metering element senses resource consumption information and relays the resource consumption data to the network communication device for processing, storage, and/or reporting to a head end or central office of a utility company. In some implementations, a network communication device may communicate with and support a single metering element (e.g., in a residential application), while in other implementations, a network communication device may communicate with and support multiple metering elements (e.g., in an apartment complex or commercial site). The metering functionality corresponding to each metering sensor may be implemented as an instance of a virtual meter in memory of the network communication device. Thus, in a case where the network communication device communicates with and supports multiple metering elements, the network communication device may include multiple virtual meter instances.

As also noted above, certain functionality and/or data of the utility meter may be subject to more stringent requirements than other functionality and/or data. This application further describes a metering approach using multiple application spaces that are isolated or partitioned from one another. For instance, a first application space may be configured to comply with requirements of customers, utility companies, and/or governing bodies and may be locked against modification. A second application space may be isolated from the first application space and may be unlocked to allow modification or update. In another example, a first application space may be accessible by third party devices or services (e.g., in-home displays, appliances, third party applications, etc.), while a second application space may be accessible only by authorized devices or services (e.g., devices administered by the utility company, official or approved applications, etc.). In some examples, the multiple application spaces may be entirely isolated from one another, each including its own operating system, applications, and data stores. However, in other examples, the separate application spaces may share certain functionalities (e.g., certain drivers) and/or may access a common data store.

Example Unified Metering Platform

Figure 1:
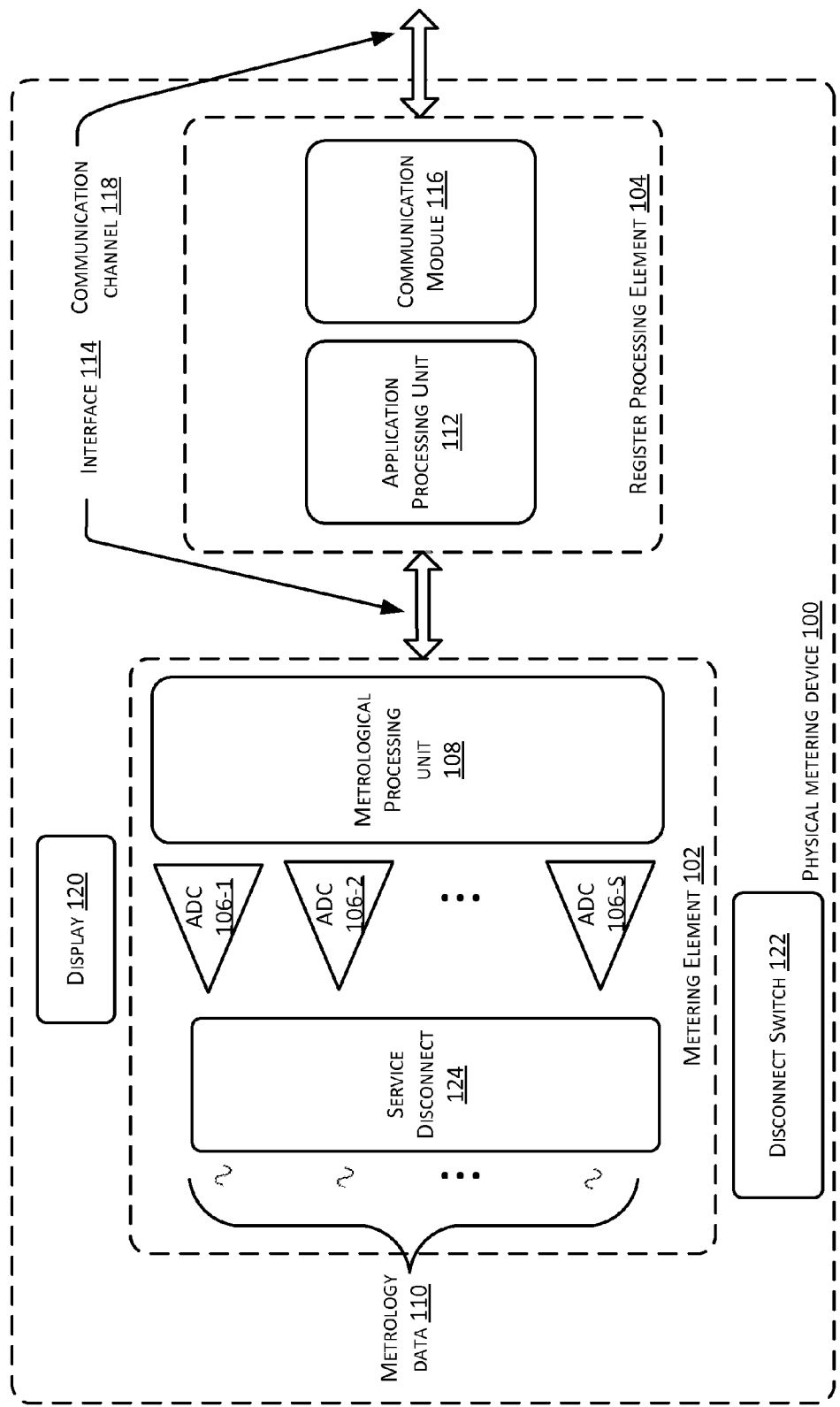
FIG. 1 illustrates an example unified metering platform in which metering functionality is performed by a single physical device.

FIG. 1 shows an example unified metering platform in which a single physical metering device 100 includes complete metering functionality. As shown in FIG. 1, the example physical metering device 100 may include a metering element 102 and a register processing element 104. The metering element 102 may include one or more analog-to-digital converters (ADCs) 106-1, 106-2, . . . , 106-S (collectively referred to as analog-to-digital converters 106), which convert one or more analog signals or inputs into digital signals or inputs. S is an integer greater than or equal to one. The metering element 102 may further include a metrological processing unit 108. The metrological processing unit 108 is configured to digitally sample metrology data 110 (such as voltage and/or current inputs associated with a site or appliance to which the example physical metering device 100 is attached, for example). The metrology processing unit 108 may further perform basic computations (e.g., mathematical calculations representing active, real and reactive power and energy for an electricity meter) on the digitalized metrology data that has been converted by the one or more analog-to-digital converters 106.

In one implementation, the register processing unit 104 may include an application processing unit 112. The application processing unit 112 receives metrology data that has been processed by the metrological processing unit 108 of the metering element 102 through an interface 114 (e.g., serial interface, universal serial bus, or other physical connection). Upon receiving the processed metrology data, the application processing unit 112 may perform one or more operations on the processed metrology data including, but not limited to, data storage, retrieval, display, user input and/or communication. In one implementation, the register processing element 104 may further include a communication module 116 which communicates data between the register processing element 104 (or the example physical metering device 100) and an associated utility provider. The communication module 116 may transmit and receive data through a communication channel 118 including, for example, a radio frequency (RF) channel, a power line communication (PLC) channel, a cellular communication channel, etc.

Additionally, in some implementations, the example physical metering device 100 may include a display 120, which shows readings such as utility consumption readings of the site or appliance. In some instances, the example physical metering device 100 may further include a service disconnect switch 122, which allows a remote disconnection 124 of an associated utility service from serving the site or appliance in response to receiving an control signal or instruction from the associated utility provider through the communication module 116 of register processing element 104.

In some instances, the example physical metering device 100 may include an operating system (e.g., a multi-tasking operating system such as Linux®, Windows®, Unix®, etc.) and a metering application running on the operating system to perform operations on the processed metrology data in the register processing unit 104 as described above.

Example Distributed Metering Platform

In addition to the unified metering platform, this disclosure also describes a distributed metering platform, in which functionality of a smart utility meter is split between a metering element at a point of service (which may have a smaller form factor than a full service utility meter) and a network communication device that is disposed at a location remote from the metering element. The network communication device of the distributed metering platform virtualizes one or more functions associated with a physical metering device with full functionality as a virtual meter (or virtual metering application). The virtual meter enables a separation or partition of functions and/or memory spaces normally provided or included in a physical metering device (such as the example physical metering device 100), and allows implementation of the functions and/or the memory spaces in one or more virtual meters running in memory of the network communication device. For example, the network communication device may virtualize part or all of the functions associated with the register processing element 104 of the example physical metering device 100 as a virtual meter. The network communication device may communicate with a remote metering element through a communication network. In other examples described in more detail below, a single network communication device may be in communication with multiple metering elements, and may host multiple virtual meters (e.g., a separate virtual meter instance corresponding to each metering element with which it is in communication).

Figure 2:
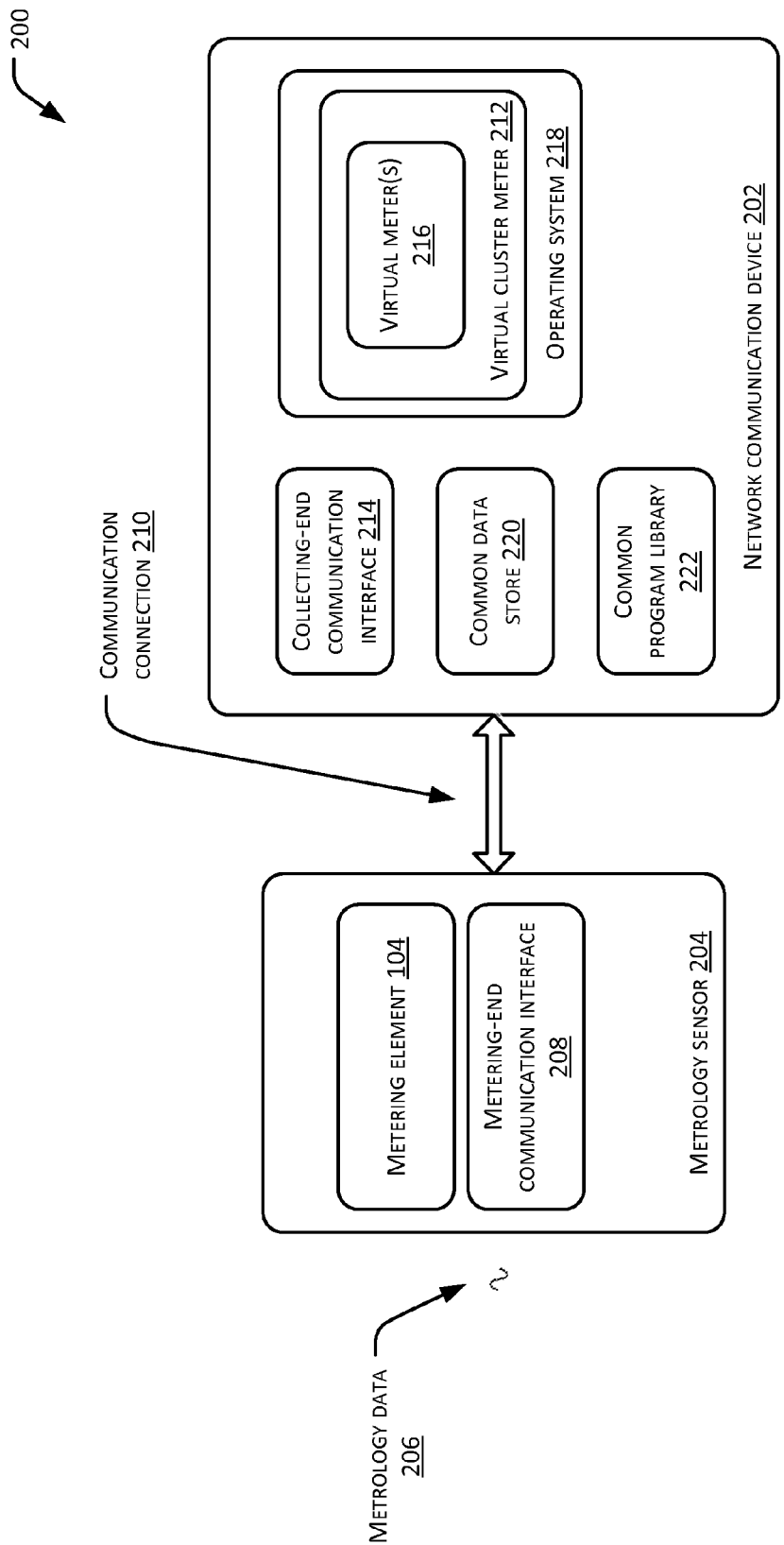
FIG. 2 illustrates an example distributed metering platform in which metering functionality is distributed across multiple physical devices.

FIG. 2 shows an example distributed metering platform 200, which is implemented in a plurality of devices including, for example, a network communication device 202 and a metrology sensor 204. In this example, the network communication device 202 is separate or remote from the metrology sensor 204. The metrology sensor 204 may include a basic metrology sensor that is configured to collect and/or sample metrology data 206 associated with a site or an appliance attached therewith. The metrology data 206 may include a single or multiple phase service. In some implementations, the basic metrology sensor may further perform basic or preliminary computation on the collected (and/or sampled) metrology data 206 prior to sending the metrology data to the network communication device 202. An example of the metrology sensor 204 may include a metering element such as the metering element 104 of the example physical metering device 100. Additionally, the metrology sensor 204 may further include a metering-end communication interface 208, which facilitates data communication between the metrology sensor 204 and the network communication device 202 via a communication connection 210. In one implementation, the communication connection 210 may include a near-field communication connection or a short-range communication connection including, for example, a wireless connection (e.g., a short-range radio frequency (RF) channel connection, a WiFi connection, etc.) or a wired connection (e.g., USB, Ethernet, PLC, or other physical cable connection). In one implementation, the metrology data 206 may include, but is not limited to, consumption data of a utility service associated with the site or the appliance, identification information of the site or the appliance, and/or identification information of the metrology sensor 204, for example. The utility service may include, for example, a water service, a gas service, an electricity service, etc.

The network communication device 202 may include a virtual cluster meter 212, which, in one implementation, performs functionality similar to the register processing element 104 of the example physical metering device 100. The network communication device 202 may further include a collecting-end communication interface 214 that facilitates communication with the metrology sensor 204 via the communication connection 210. In one implementation, the virtual cluster meter 212 may include an instance of a virtual meter (or application) 216 including functionality similar to that of the physical metering device 100. The instance of the virtual meter 216 may perform one or more functions similar to those performed by the metering application of the register processing element 104 of the example physical metering device 100. The instance of the virtual meter 216 may run in or on an operating system 218 included in the network communication device 202. In some implementations, the operating system 218 of the network communication device 202 may be common to all of the virtual meters. In other implementations, each virtual meter 216 (or instance of the virtual meter 216) may include its own instance of the operating system and associated drivers of the operating system.

Although in the above example, the distributed metering device 200 is described to include a single network communication device 202 and a single metrology sensor 204, in some instances, the distributed metering device 200 may include more than one metrology sensor 204. Each metrology sensor 204 may be associated with a single instance of a virtual meter 216 in the virtual cluster meter 212. Additionally or alternatively, in some implementations, one or more metrology sensors 204 may each be associated with multiple instances of a virtual meter 216 and/or multiple virtual meters 216. In this respect, the collecting-end communication interface 214 may support communication between metrology sensors 204 and virtual meters 216. For example, upon receiving metrology data from a certain metrology sensor 204, the collecting-end communication interface 214 may route the metrology data to a virtual meter 214 to which this metrology sensor 204 corresponds for subsequent processing.

In one implementation, the virtual meter 216 may include a plurality of applications (such as a metering/metrology application, a utility data analysis application, a fraud detection application, etc.). The plurality of applications may be isolated from one another within the virtual meter 216. Additionally or alternatively, the virtual meter 216 may be isolated from other virtual meters. For example, a virtual meter may be prevented from accessing (e.g., reading) and/or manipulating (e.g., editing, modifying, writing, etc.) some or all of the data associated with another virtual meter. Additionally or alternatively, a virtual meter may be restricted from affecting one or more applications and/or data included in another virtual meter. The distributed metering device 200 (or the virtual cluster meter 212) may enforce this isolation by allocating a designated memory space or partition for each virtual meter and/or establishing a mapping relationship between each virtual meter and respective one or more applications and/or data. The distributed metering device 200 (or the virtual cluster meter 212) may determine whether a virtual meter is allowed to access certain data and/or use an application by examining whether the data or the application is located within a designated memory space allocated for that virtual meter and/or whether a mapping relationship between the virtual meter and the application exists in the distributed metering device.

Additionally, the network communication device 202 may further include a common data store 220 and/or program library 222 that is/are shared and/or accessible by the one or more virtual meters (or one or more applications of the one or more virtual meters). The data store 220 may store common data or information that is usable by the virtual meters. The program library 222 may include one or more routines or programs that the virtual meters may employ for performing one or more operations for data from respective metrology sensors.

By virtualizing one or more functions of a physical metering device (that has complete metering functionality) and separating a virtual meter from the rest of the physical metering device, the described system enables a new metering device to focus on collecting or sampling metrology data associated with a site or an appliance. Further, the described system allows the new metering device to have a smaller size and/or a less processing power (thus a lower cost) than a conventional metering device.

In the above example, the virtual meter 214 is described to exist in the network communication device 202 (or the virtual cluster meter 212) of the distributed metering device 200. However, in some implementations, some or all of the functions of the virtual meter 214 may alternatively exist in a metering device that performs collection and/or sampling of metrology data from a site or appliance (e.g., the metrology sensor 204 or the example physical metering device 100) based on, for example, physical size, memory and/or processing power requirements of the metering device, etc.

The application describes multiple and varied embodiments and implementations. The following section describes an example environment that is suitable for practicing various implementations. Next, the application describes example systems, devices, and processes for virtualizing a metering device and processing metrology data using the virtual meter.

Example Environment

Figure 3:
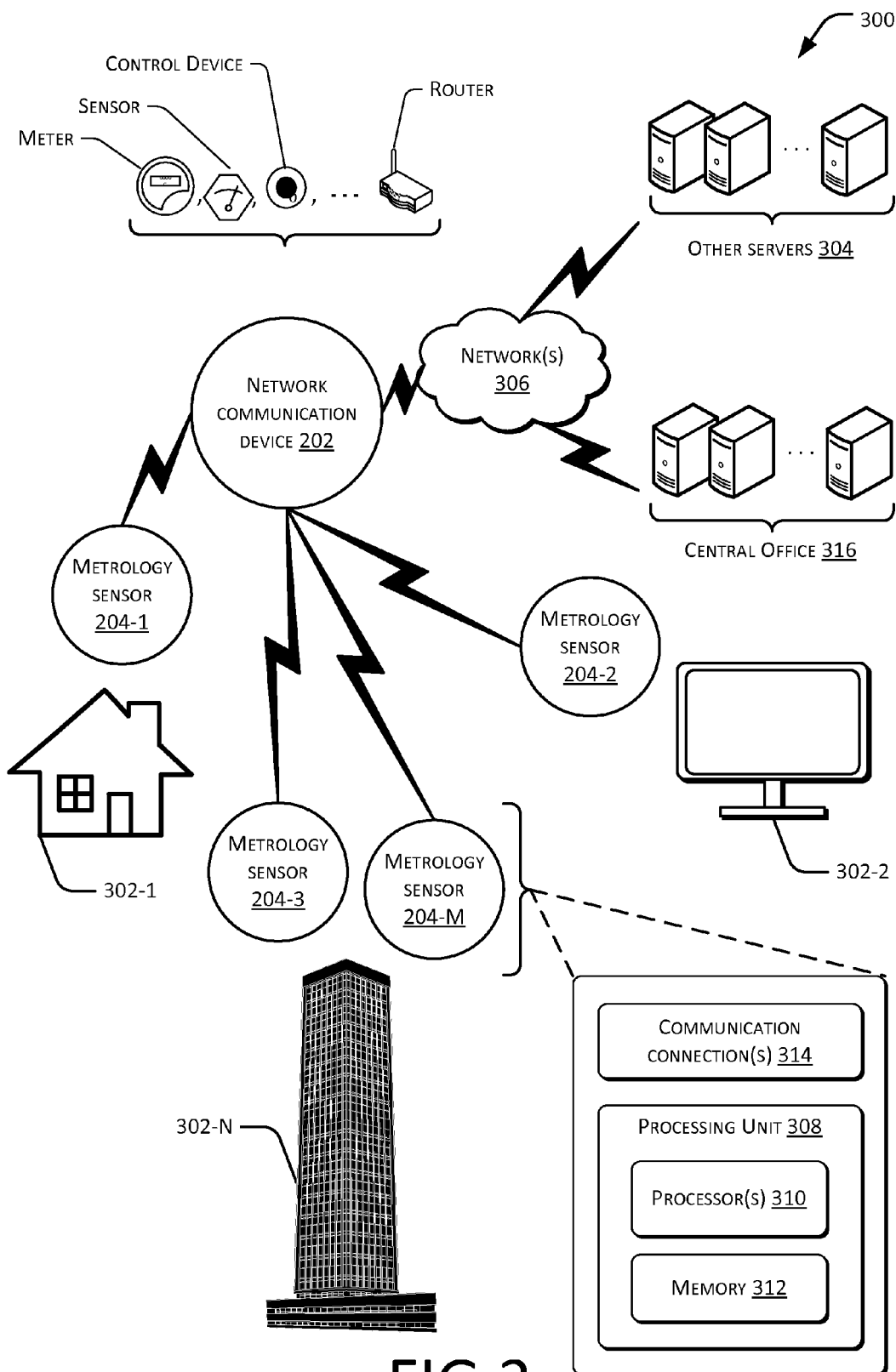
FIG. 3 illustrates an example networking environment in which the example distributed metering platform may be implemented.

FIG. 3 is a schematic diagram of an example networking environment 300 usable to implement the example distributed metering device 200. The networking environment 300 may further include the network communication device 202 and one or more utility metering devices or metrology sensors 204-1, 204-2, . . . , 204-M (collectively referred to as the metrology sensors 204 as described above) associated with one or more sites 302-1, 302-2, . . . , 302-N (collectively referred to as sites 302). M and N may be the same or different and are integers greater than or equal to one. In this example, the network communication device 202 may include the virtual cluster meter 212. In some implementations, the networking environment 300 may further include one or more servers 304. The one or more metrology sensors 204 may communicate data with the network communication device 202 via the communication connection 210. The network communication device 202 may communicate with the one or more servers 304 through a communication network 306.

In this example, the virtual cluster meter 212 (and/or the network communication device 202) is described to be separate or remote from the one or more metrology sensors 204. For example, the one or more metrology sensors 204 may be located in one location (e.g., a closet or enclosure of an apartment complex), while the virtual cluster meter 212 (and/or the network communication device 202) may be installed in a second location remote from the first location (e.g., an exterior of the closet or enclosure, another room of the apartment complex, a roof or exterior of the apartment building, etc.). Furthermore, some or all of the functions of the virtual cluster meter 212 (and/or the network communication device 202) may be implemented by the servers 304.

Furthermore, in some instances, some or all of the functions of the virtual cluster meter 212 (and/or the network communication device 202) may be implemented in a distributed computing system or architecture, e.g., a cloud computing system or architecture. Additionally or alternatively, in some implementations, some or all of the functions of the virtual cluster meter 212 (and/or the network communication device 202) may be implemented as one or more services. For example, some or all of the functions of the virtual cluster meter 212 (and/or the network communication device 202) may be implemented as one or more cloud services provided by one or more computing devices including the metrology sensors 204, the network communication device 202 and/or the servers 304, for example.

In one implementation, the site may include a real property such as a residential or business property or unit (e.g., a room, an apartment, a house, an office, a multi-unit building, an apartment complex, etc.). Additionally or alternatively, in some implementations, the site may include an appliance (such as a water heater, a furnace, an air conditioning system, etc.). In some implementations, the site may include one or more real properties and/or appliances sharing a common utility metering device, such as the metrology sensor 204, for example.

Furthermore, the communication connection 210 may include a short-range communication connection and/or a near-field communication connection. The short-range communication connection may include, for example, a short-range wireless connection (such as a WiFi connection, a short-range radio frequency (RF) channel connection, etc.), a wired connection (such as USB, Ethernet, PLC, or other physical cable connection), or both wireless and wired connections.

In some implementations, the communication network 306 may be a wireless or a wired network, or a combination thereof. The communication network 306 may be a collection of individual networks interconnected with each other and functioning as a single large network (e.g., the Internet or an intranet). Examples of such individual networks include, but are not limited to, neighborhood area networks (NAN), telephone networks, cable networks, Local Area Networks (LANs), Wide Area Networks (WANs), and Metropolitan Area Networks (MANs). Further, the individual networks may be wireless or wired networks, or a combination thereof. In some implementations, the communication network 306 may employ a radio frequency (RF) channel, a power line communication (PLC) channel, a cellular communication channel, etc., for transmitting data.

Furthermore, the network communication device 202 may be implemented as one of a variety of devices including, for example, control devices, transformers, routers, servers, relays (e.g., cellular relays), switches, valves, combinations of the foregoing, or a network device couplable to the communication network 306 and capable of sending and/or receiving data on behalf of the metrology sensor 204. In one implementation, the metrology sensor 204 communicates data with an associated utility provider (e.g., the servers 304) partially or entirely through the network communication device 202.

In one implementation, the metrology sensor 204 may be implemented as one of a variety of devices, which include, for example, smart utility meters (e.g., electric, gas, and/or water meters), sensors (e.g., temperature sensors, weather stations, frequency sensors, etc.), or a combination of the foregoing. The metrology sensor 204 collects and/or samples metrology data (or resource consumption information) associated with a site (such as a residential site, for example) and sends the metrology data (with or without basic processing) to the network communication device 202 for processing. The metrology data may include, but is not limited to, consumption data of a utility service (such as a water service, a gas service and/or an electricity service, etc.) associated with the site. Additionally, the metrology data may include identification information (e.g., consumer number) of the site and/or identification information (e.g., a device identifier, etc.) of the metrology sensor 204, etc.

Additionally, in some implementations, the metrology sensor 204 (as representative by the metrology sensor 204-M in FIG. 3) may include a processing unit 308 (as compared to the metrology processing unit 108 as shown in FIG. 1). The processing unit 308 may include one or more processor(s) 310 communicatively coupled to memory 312. The memory 312 may be configured to store one or more software and/or firmware modules, which are executable on the processor(s) 310 to implement various functions. While the modules are described herein as being software and/or firmware stored in memory and executable on a processor, in other implementations, any or all of the modules may be implemented in whole or in part by hardware (e.g., as an ASIC, a specialized processing unit, etc.) to execute the described functions.

The memory 312 may comprise processor-readable media and may take the form of volatile memory, such as random access memory (RAM) and/or non-volatile memory, such as read only memory (ROM) or flash RAM. Processor-readable media includes volatile and non-volatile, removable and non-removable media implemented in any method or technology for storage of information such as processor-readable instructions, data structures, program modules, or other data for execution by one or more processors. Examples of processor-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, processor-readable media does not include communication media, such as modulated data signals and carrier waves.

In some implementations, the metrology sensor 204 may optionally include a communication connection 314. The communication connection 314 includes a short-range communication connection, a near-field communication connection, etc. The short-range communication connection may include, for example, a short-range wireless connection (such as a WiFi connection, a short-range radio frequency (RF) channel connection, etc.), a wired connection (such as USB, Ethernet, PLC, or other physical cable connection), or both wireless and wired connections. The near-field communication connection may include, for example, a Bluetooth® connection, etc.

In some implementations, the networking environment 300 may further include a central office 316. In some examples, the central office 316 includes a centralized meter data management system that performs processing, analysis, storage, and/or management of data received from one or more of the metrology sensor 204 through the network communication device 202. Additionally or alternatively, the central office 316 may include a network management system (NMS) for maintaining a registry of devices of the AMI network, device configuration settings, version information, and the like. Although the example of FIG. 3 illustrates the central office 316 in a single location, in some examples the central office 316 may be distributed amongst multiple locations (e.g., the servers 304) and/or may be eliminated entirely (e.g., in the case of a highly decentralized distributed computing platform).

Figure 4:
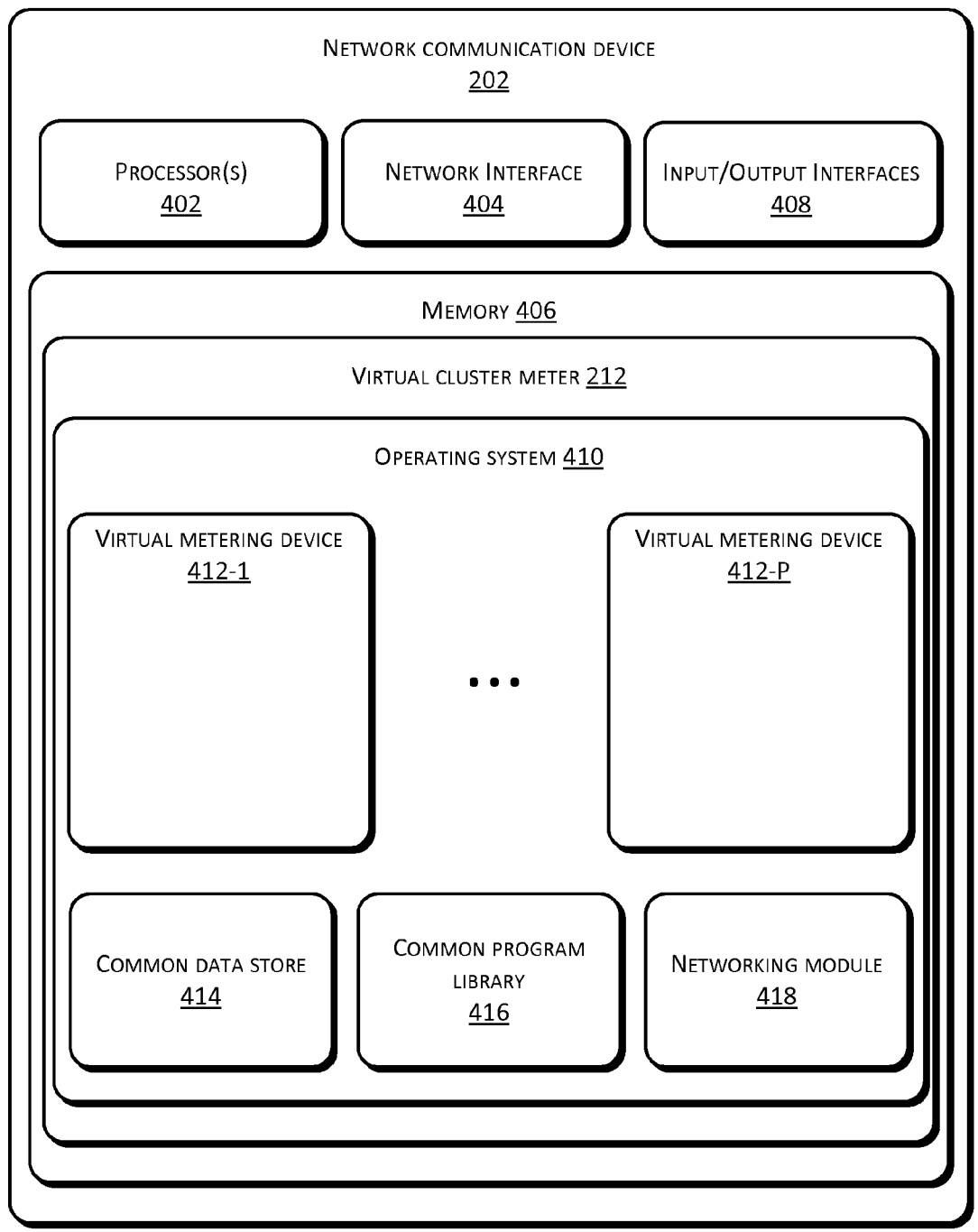
FIG. 4 illustrates an example network communication device configured to implement the distributed metering platform of FIG. 2.

FIG. 4 illustrates the network communication device 202 in more detail. In one implementation, the network communication device 202 may include, but is not limited to, one or more processors 402, a network interface 404 and memory 406. In some implementations, the network communication device 202 may optionally include an input/output interface 408. The processor(s) 402 is configured to execute instructions received from the network interface 404 (e.g., the collecting-end communication interface 214 as shown in FIG. 2), received from the input/output interface 408, and/or stored in the memory 406. The memory 406 may include processor-readable media.

In the following example implementations, virtual meters (or virtual metering applications) are described to be present and/or instantiated in the network communication device 202 (and/or the virtual cluster meter 212). However, in some implementations, one or more virtual meters (or applications) may be present and/or instantiated in a metrology sensor 204 (if, for example, the metrology sensor 204 possesses minimal memory and processing capabilities for running the one or more virtual meters or applications). Additionally or alternatively, a virtual meter (or functions of a virtual meter) may be distributed between the network communication device 202 and an associated metrology sensor 204.

In one implementation, the network communication device 202 may include an operating system 410. The operating system 410 may include, for example, a multi-tasking operating system such as, for example, Linux®, Unix®, Windows CE®, etc. In one implementation, part or all of the operating system 410 may also be included in the virtual cluster meter 212. Alternatively, the virtual cluster meter 212 may be included as an application or service supported by the operating system 410. In an example implementation described as follows, the operating system 410 is described to be included in the virtual cluster meter 212.

In one implementation, the virtual cluster meter 212 may include one or more instances of one or more virtual meters 412-1, . . . , 412-P (collectively referred to as virtual meters 412) running in the operating system 410. P is an integer greater than or equal to one. In other instances, a virtual meter 412 (or an instance of a virtual meter) may include its own instance of an operating system (e.g., the operating system 410) and its associated drivers. Each instance of a virtual meter 412 may be associated with at most one metrology sensor 204 connected to the network communication device 202. Additionally or alternatively, one or more instances of a virtual meter 412 may be associated with a single metrology sensor 204. In some implementations, instances of a plurality of different virtual meters 412 may be associated with a single metrology sensor 204. Instances of a same virtual meter 412 correspond to instances created or instantiated from a same set of software components and data provided by the operating system 410 and/or the virtual cluster meter 202. Instances of different virtual meters 412 correspond to instances created or instantiated from different (partially overlapping or completely non-overlapping) sets of software components and data provided by the operating system 410 and/or the virtual cluster meter 202. In one implementation, each instance of a virtual meter 412 is assigned with an instance identifier or a group identifier as identification information of the respective instance.

The virtual cluster meter 212 may instantiate more than one instance of a virtual meter 412 or instances of more than one virtual meters 412 for a single metrology sensor 204 with different instances or virtual meters performing different operations on metrology data received from the single metrology sensor 204. Examples of different operations on the metrology data may include, for example, processing of the metrology data for a billing purpose, processing of the metrology data for determining characteristics of the metrology data (e.g., utility consumption associated with a residential site to which the single metrology sensor 204 is attached), monitoring quality of the utility service, etc.

In one implementation, the virtual cluster meter 212 (or the virtual meter 412) may communicate data (such as control signal, metrology data, etc.) with a corresponding metrology sensor 204 through the communication connection 210. For example, the virtual cluster meter 212 (or the virtual meter 412) may communicate data with a metrology sensor 204 using a secure encryption protocol or algorithm. Examples of the secure encryption protocol or algorithm may include, for example, a shared key encryption, a public/private key encryption, a digital signature, a message authentication code (MAC), etc. Depending on the processing and encryption capabilities of the metrology sensor 204, one or more encryption protocols or algorithms may be selected for the data communication. For instance, in some implementations, the virtual cluster meter 212 (or the virtual meter 412) may send a control signal or instruction to a metrology sensor 204 to actuate a disconnect switch (such as the disconnect switch 122) which may be implemented in or attached to the metrology sensor 204 using a secure encryption protocol, for example, a digital signature.

Furthermore, the virtual cluster meter 212 (or the network communication device 202) may dedicate or allocate a memory space storing information related to each instance of a virtual meter 412. The information may include, for example, data and application programs associated with the instance of the virtual meter 412. In one implementation, each instance of a virtual meter 412 is isolated from other instances of a same virtual meter 412 and/or a different virtual meter 412. For example, data in a first memory space allocated to a first instance of a first virtual meter may be inaccessible by a second instance of a second instance virtual meter where the first virtual meter and the second virtual meter may be the same or different. Additionally or alternatively, the first instance of the first virtual meter and the second instance of the second virtual meter are isolated from each other in a sense that one instance cannot affect operations and data of another instance. In one implementation, the virtual cluster meter 202 may enforce this isolation by allocating a designated memory space for each virtual meter 412 and/or establishing a mapping relationship between each virtual meter 412 and respective one or more applications and/or data. For example, each virtual meter 412 (or each instance of a virtual meter 412) may be running in a protected mode. In one implementation, the protected mode may be provided and/or enforced by hardware in the network communication device 202 (for example, a memory management unit (MMU) or paged memory management unit (PMMU) that is included in a computing device and responsible for handling access to memory requested by a processor). The virtual cluster meter 202 may determine whether a virtual meter 412 is allowed to access certain data and/or use an application by examining whether the data and/or the application are located within a designated memory space allocated for that virtual meter 412 and/or a mapping relationship between the virtual meter 412 and the application exists in the virtual cluster meter 202.

Additionally, the network communication device 202 (or the virtual cluster meter 212) may further include a common data store 414 and/or program library 416 which is/are shared and/or accessible by the one or more virtual meters 412 (or one or more application programs of the one or more virtual meters 412). The data store 414 may store common data or information that is usable by the virtual meters 412. The program library 416 may include one or more routines or programs that the virtual meters 412 may employ for performing one or more operations for data from respective metrology sensors 204.

In one implementation, each instance of a virtual meter 412 may separately communicate (receive and/or send) data with a corresponding metrology sensor 204 through the network interface 404 (e.g., the collecting-end communication interface 214 as shown in FIG. 2). As described above, each instance of a virtual meter 412 may separately communicate data with the corresponding metrology through the network interface 404 via the communication connection 210. The network interface 404 supports communication between metrology sensors 204 and virtual meters 412. For example, upon receiving metrology data from a certain metrology sensor 204, the network interface 404 may route the metrology data to a virtual meter 412 to which this metrology sensor 204 corresponds for subsequent processing. The network interface 404 may determine which instance of virtual meter 412 corresponds to which metrology sensor 204 based on, for example, identification information of the metrology sensor 204 and/or identification information of the instance of virtual meter 412.

Additionally, the network communication device 202 may include a networking module 418 that transmits the metrology data received from the one or more metrology sensors 204 to an associated utility provider (e.g., the servers 304 or the central office 316) after processing by respective instances of the virtual meters 412. In one implementation, prior to sending the processed metrology data, the networking module 418 may segregate the processed metrology data according to metrology sensors 204, virtual meter instances and/or virtual meters, and separately send the segregated metrology data to the utility provider. Alternatively, the networking module 418 may send the processed metrology data of the metrology sensors to the utility provider without segregation.

In some implementations, the networking module 418 may receive a control signal or instruction from the utility provider to remotely disconnect the utility service from supplying or serving the site 302 (such as a residential site, for example) to which the metrology sensor 204 is attached. In response to receiving the control signal or instruction, the network communication device 202 may send the control signal to a service disconnect switch (similar to the service disconnect switch 120) attached to the metrology sensor 204 to remotely disconnect the utility service from serving the site 302.

Figure 5:
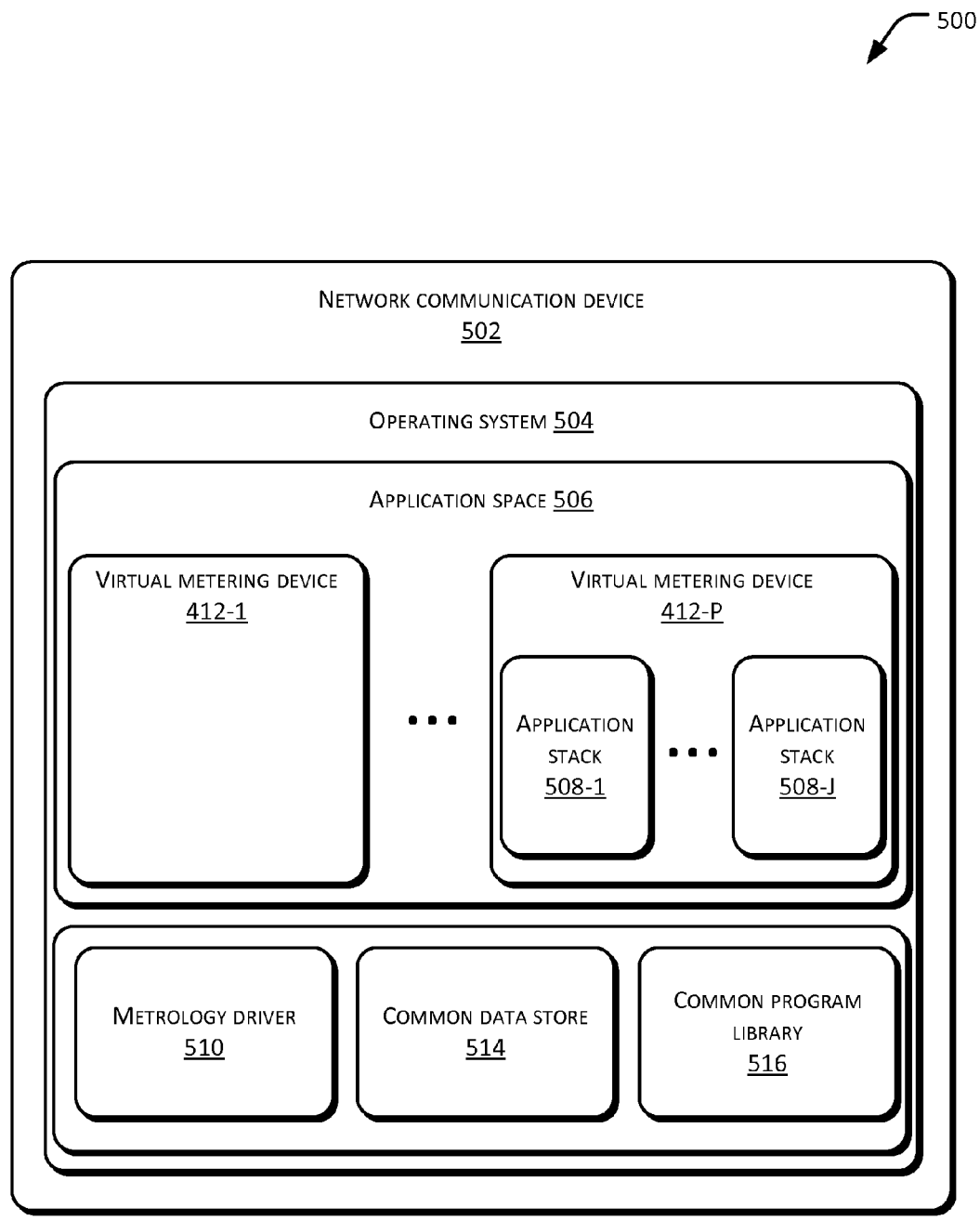
FIG. 5 illustrates an example computing environment usable to implement a virtual meter.

FIG. 5 shows an example computing environment 500 usable to implement one or more virtual meters 412 in more detail. In this example, the one or more virtual meters 412 (i.e., virtual meters 412-1, ..., 412-K) are described to be instantiated and/or run in a network communication device 502. K is an integer greater than or equal to one. In one implementation, the network communication device 502 may include, for example, functionality similar to the physical metering device 100, the distributed metering device 200, the network communication device 202, the metrology sensor 204 and/or the virtual cluster meter 212. In some implementations, the network communication device 502 may include a utility meter or a utility computing device. The one or more virtual meters 412 may run in or on an operating system 504 (such as the operating system 410 if the network communication device 502 corresponds to the virtual cluster meter) in memory (such as the memory 406 if the network communication device 502 corresponds to the network communication device 202). The operating system 504 may include a multitasking operating system such as Linux®, Unix®, Windows CE®, etc. In one implementation, the one or more virtual meters 412 may be instantiated and run in a user or application space 506 of the operating system 504.

In one implementation, a virtual meter 412 (as representative by the virtual meter 412-K) may include one or more application stacks 508-1, ..., 508-J (collectively referred to as application stacks 508). J is an integer greater than or equal to one. Each application stack 508 may include a self-contained "stack" of data and codes (and/or applications) that create the data. An application stack 508 may run in its own directory on a file system and may be upgraded independently from other application stacks 508 (whether the other application stacks belong to a same or different instance of a virtual meter 412, for example).

In one implementation, an instance of a virtual meter 412 (or a virtual meter instance) may include different types of codes and/or data which may be partitioned and/or stored in different application stacks 508. By way of example and not limitation, a virtual meter instance may include, for example, a locked version of code that is unchangeable once stored in memory and an unlocked version of code that is changeable once stored in the memory. As noted above, certain functionality and/or data of a network communication device 502 may be subject to more stringent requirements than other functionality and/or data. In one implementation, the network communication device 502 (or a virtual meter instance) may fulfill these requirements using multiple application spaces that are isolated or partitioned from one another. For instance, a first application space may be configured to comply with requirements of customers, utility companies, and/or governing bodies and may be locked against modification. A second application space may be isolated from the first application space and may be unlocked to allow modification or update. In another example, a first application space may be accessible by third party devices or services (e.g., in-home displays, appliances, third party applications, etc.), while a second application space may be accessible only by authorized devices or services (e.g., devices administered by the utility company, official or approved applications, etc.). In some examples, the multiple application spaces may be entirely isolated from one another, each including its own operating system, applications, and data stores. However, in other examples, the separate application spaces may share certain functionalities (e.g., certain drivers) and/or may access a common data store.

For example, an instance of a virtual meter 412 (and/or the virtual cluster meter 202) may include a time of use (TOU) application which may or may not be locked depending on whether the TOU application has been approved or certified by a governing body, for example. The TOU application enables the utility provider to bill or charge a utility consumer associated with a metrology sensor 204 corresponding to the instance of the virtual meter 412 differently based on a time of day. For example, the TOU application may include two different two periods: "on-peak" and "off-peak" and designate different times, days, weeks, months and/or seasons as one of the two periods as defined by the utility provider, for example. Additionally or alternatively, the instance of a virtual meter 412 (and/or the virtual cluster meter 202) and include a load profile application for the utility consumer associated with the metrology sensor 204 corresponding to the instance of the virtual meter 412. The load profile application may detect and/or analyze a load profile (such as utility usage or consumption) of the utility consumer over time, and provide information of this profile to the utility provider. This profile information may allow the utility provider to determine and generate utility service that would be sufficient for its utility consumers including the utility consumer of which the profile is analyzed in advance.

By way of example and not limitation, the locked version of code may include, for example, one or more functions and/or parameters that are used for processing metrology (such as functions and/or parameters used for billing purpose, etc). Additionally or alternatively, the locked version of code may include a version of code that is approved by a governing body. The governing body may include an authorized entity overseeing and/or certifying whether the network communication device 502 meets legal and/or device requirements established in a country in which the network communication device 502 is installed. Additionally or alternatively, the locked version of code may include a version of legally relevant code that includes attributes or characteristics regulated by legal metrology and/or subject to legal control. Examples of the locked version of code include an application stack including equations or formulas used to compute utility consumption that are not allowed to be changed or altered once instantiation.

The unlocked version of code may include a version of non-legally relevant code (i.e., code that does not include attributes or characteristics regulated by legal metrology and/or subject to legal control). Additionally or alternatively, the unlocked version of code may include a version of code that is not yet approved by the governing body for processing metrology data (e.g., proposed new code, or pilot code). Additionally or alternatively, the unlocked version of code may include a version of code that may be vulnerable to changes over time. For example, the unlocked version of code may include an application stack that includes code accessible by third party applications, one or more new or testing versions of equations or formulas for processing metrology data, a version of code that is configured to compare results of the new or testing versions of equations or formulas with an original or approval version of equation or formula, and/or other codes for additional computation or testing such as monitoring, theft or fraud detection, data analysis, etc.

In some instances, the virtual meter instance may compare results of metrology data processed by the unlocked version of code with results of metrology data processed by the locked version of code. For example, the virtual meter instance may determine whether the results of the metrology data processed by the unlocked version of code are within a predetermined threshold of error relative to the results of metrology data processed by the locked version of code. In response to determining that differences between the results of the metrology data processed by the unlocked version of code and the results of metrology data processed by the locked version of code are within the predetermined threshold of error, the virtual meter instance may lock (or flag) the unlocked version of the code to generate a second locked version of code. In some implementations, the virtual meter instance may replace the locked version of code with the second locked version of code in response to receiving an approval of the second locked version of code from the governing body. For example, instead of looking up or identifying the previously used locked version of code for processing metrology data, the virtual meter instance may look up or identify the second (new) locked version of code for processing the metrology data. The virtual meter instance may do so by changing or updating a configuration (file) indicating that the second locked version of code is now used for processing metrology data (e.g., updating an entry associated with code for processing metrology data in a configuration file to an identifier or address of the second locked version of code).

In some implementations, the computing environment 500 may further include a metrology driver 510 running as a kernel (or a component of a kernel) of the operating system 504 in a kernel space 510 of the operating system 504. The metrology driver 510 may be loaded and remained in the kernel space 510 of the operating system when the network communication device 502 is started up. The metrology driver 510 may provide support to the one or more virtual meters 412 for processing metrology data. Additionally or alternatively, in some implementations, the metrology driver 510 may provide metrology data to a locked version of code and/or an unlocked version of code of a virtual meter instance.

In one implementation, the network communication device 502 may enforce a separation of the locked version of code and the unlocked version of code (such as legally relevant code and legally non-relevant code, for example) and isolate the locked version of code from the unlocked version of code. For example, the network communication device 502 may enforce a hard-split or soft-split between the locked version of code and the unlocked version of code by designating different memory spaces for the locked version of code and the unlocked version of code. The network communication device 502 may then restrict the unlocked version of code from accessing the memory space allocated to the locked version of code and vice versa. In some implementations however, the network communication device 502 may allow the locked version of code to access the memory space allocated to the unlocked version of code but not the opposite.

Similar to the foregoing implementations, the network communication device 502 may further designate different memory spaces for different virtual meter instances and a virtual meter instance may not be allowed to access memory space of another virtual meter instance. Additionally or alternatively, the network communication device 502 may further establish a mapping relationship between a virtual meter instance (including applications and data therein) and a memory space for enforcing isolation between the virtual meter instances. As such, the network communication device 502 isolates code, application and/or data associated with one virtual meter instance from code, application and/or data associated with another virtual meter instance such that each virtual meter instance is unable to affect operations and data of another virtual meter instance.

In one implementation, the network communication device 502 may further include a common data store 514 storing data from instances of the one or more virtual meters 412. Examples of stored data may include, for example, processed metrology data to be sent to an associated utility provider stamped or identified with respective identifiers of the virtual meter instances, the network communication device 502 or metrology sensors corresponding to the virtual meter instances in which the metrology data is processed. Additionally or alternatively, the network communication device 502 may further include a common program library 516 from which the one or more virtual meter instance may derive and/or invoke routines or functions for processing metrology data, for example.

In one implementation, the network communication device 502 may instantiate a first virtual meter instance (for example, an instance of the virtual meter 412-1) by creating instances of a first group of components that may include one or more services and/or resources provided by the operating system 504. The one or more services and/or resources may include, for example, software modules, kernels, drivers and/or programs provided in the user space and/or kernel space of the operating system 504. The network communication device 502 may assign a first instance or group identifier to the first virtual meter instance and assign a respective first component identifier to data and/or code associated with each component of the group of the first virtual meter instance.

In some implementations, the network communication device 502 may instantiate one or more other virtual meter instances. For example, the network communication device 502 may instantiate a second virtual meter instance (for example, an instance of the virtual meter 412-M) by creating instances of the same first group of components or a second group of components that is different from the first group of components. The network communication device 502 may assign a second instance or group identifier to the second virtual meter instance and assign a respective second component identifier to data and/or code associated with each component of the group of the second virtual meter instance. In one implementation, the network communication device 502 may register or record the instance or group identifier of each virtual meter instance and each component identifier associated with each virtual meter in a common database (within the common data store 514, for example). In one implementation, the network communication device 502 may allow querying of the common database or returning a query result from the common database if or only if an instance identifier and a component identifier is included as a condition for the query.

As described in the foregoing implementations, each virtual meter instance (e.g., data and applications therein) is generally independent from other virtual meter instance whether the virtual meters are instantiated using a same or different group of components provided by the operating system 504. However, in some implementations, the network communication device 502 may allow an exception. By way of example and not limitation, the network communication device 502 may allow an upgrade of a virtual meter instance (e.g., the first virtual meter instance) to a new virtual meter instance. In one implementation, the new virtual meter instance may reuse one or more components of the virtual meter instance to be upgraded, and access, modify and/or retrieve data owned by the virtual meter instance to be upgraded. This new virtual meter may include one or more additional components for upgrade.

Additionally or alternatively, the network communication device 502 may create new components for the new virtual meter instance with the new components accessing the (old) components of the virtual meter instance to be upgraded to access, modify and/or retrieve data owned by that virtual meter instance. Regardless of which implementation is used however, the network communication device 502 may assign a new instance or group identifier to the new virtual meter instance and a new component identifier to each new component (or data associated with the each component) of the new virtual meter instance.

Exemplary Methods

Figure 6:
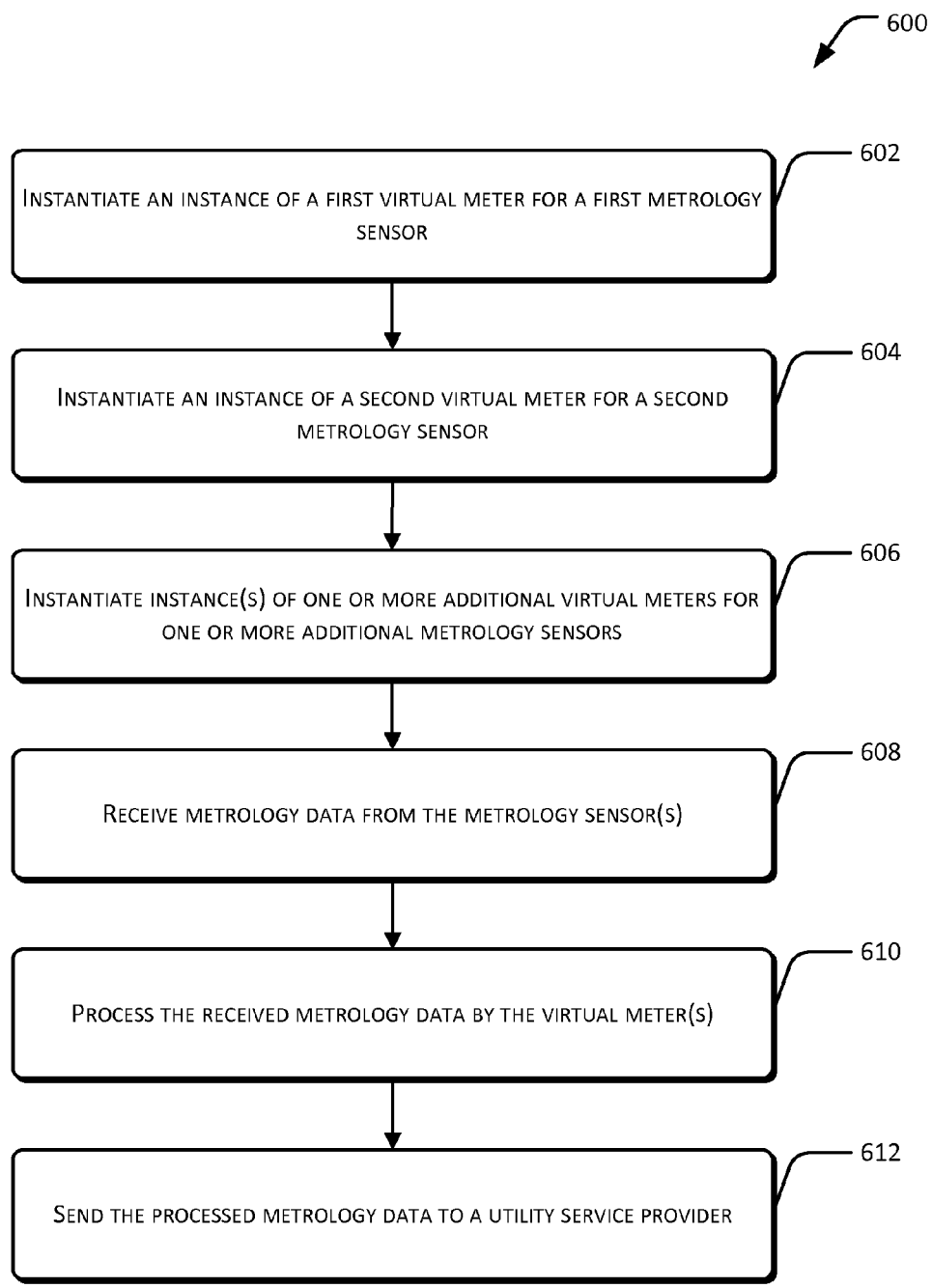
FIG. 6 illustrates an example method of processing metrology data using a virtual meter.
Figure 7:
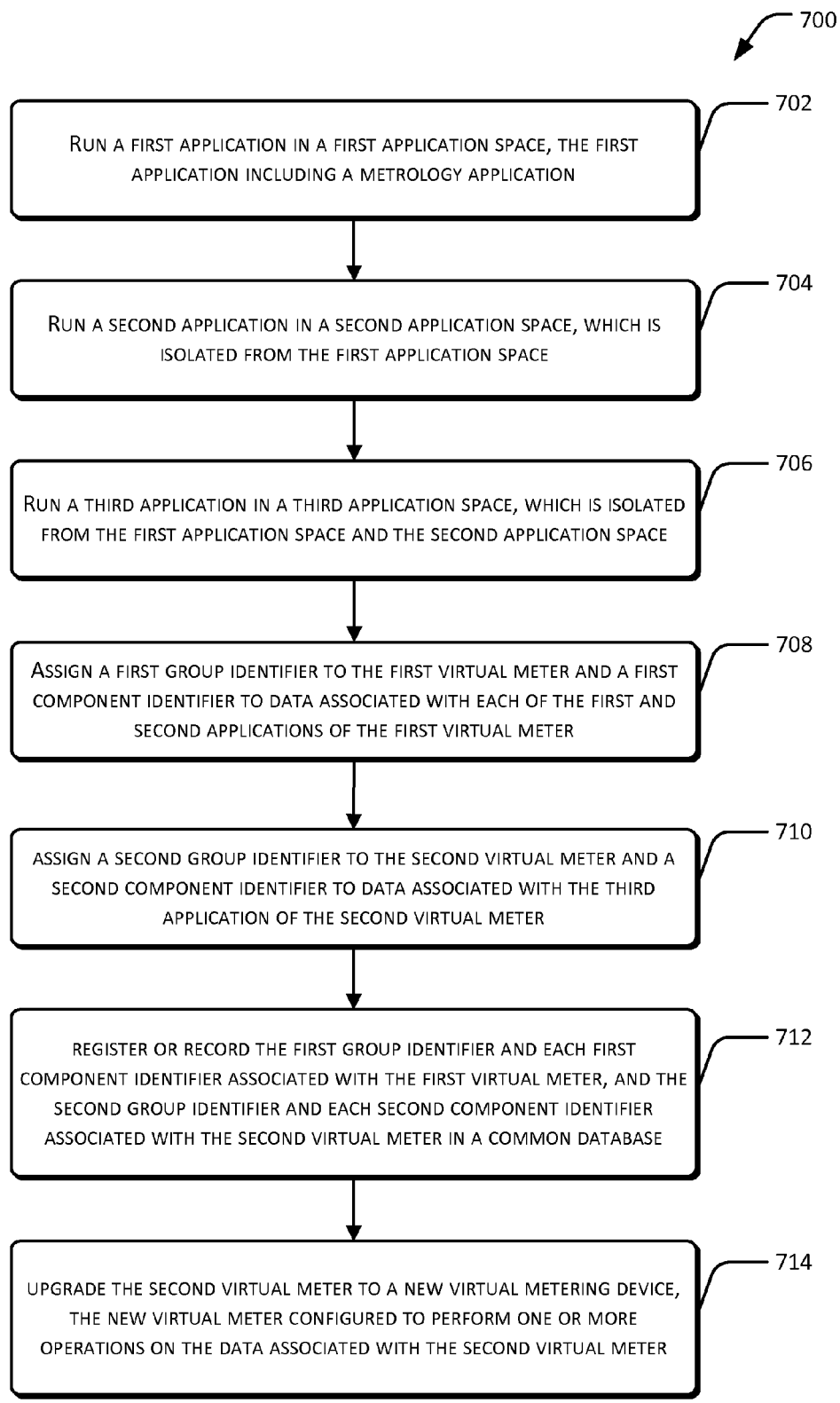
FIG. 7 illustrates an example method of running a plurality of applications in isolated application spaces.

FIG. 6 is a flowchart depicting an example method 600 of processing metrology data using a network communication device hosting one or more virtual meters. FIG. 7 is a flowchart depicting an example method 700 of running a plurality of applications in isolated application spaces. The methods of FIG. 6 and FIG. 7 may, but need not, be implemented in the example implementations and environments of FIGS. 1-5. For ease of explanation, methods 600 and 700 are described with reference to FIGS. 1-5. However, the methods 600 and 700 may alternatively be implemented in other environments and/or using other devices or systems.

Methods 600 and 700 are described in the general context of computer-executable instructions. Generally, computer-executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network. In a distributed computing environment, computer-executable instructions may be located in local and/or remote computer storage media, including memory storage devices.

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations.

Referring back to FIG. 6, at block 602, the network communication device 202 may instantiate an instance of a first virtual meter. In one implementation, the network communication device 202 may instantiate this instance of the first virtual meter in response to receiving an indication that a connection with a metrology sensor 204 is established. Additionally or alternatively, the network communication device 202 may instantiate this instance of the first virtual meter in response to receiving a signal or instruction from an associated utility provider or an authorized person related to the utility provider. The metrology sensor 204 may be remote to the network communication device 202. The instance of the first virtual meter is configured to receive metrology data from the metrology sensor 204 through a communication connection.

At block 604, the network communication device 202 may further instantiate an instance of a second virtual meter for a second metrology sensor 204. The second metrology meter 204 may be the same or different from the first metrology sensor 204. In either case, the network communication device 202 may instantiate the instance of the second virtual meter in a memory space that is isolated from and inaccessible by the instance of the first virtual meter.

At block 606, the network communication device 202 may further instantiate one or more instances of one or more additional virtual meters for one or more additional metrology sensors. The network communication device 202 may instantiate each virtual meter instance in a memory space that is isolated from and inaccessible by the other virtual meter instance.

At block 608, the network communication device 202 receives metrology data from one or more metrology sensors 204. In one implementation, the network communication device 202 may receive metrology data from the metrology sensors 204 continuously or on a periodic basis. Additionally or alternatively, the network communication device 202 may receive metrology data from the metrology sensors 204 after sending a control signal or instruction to the metrology sensors 204 to retrieve the metrology data.

At block 610, one or more corresponding virtual meters process metrology data received from the one or more metrology sensors 204.

At block 612, the network communication device 202 or the one or more corresponding virtual meters send or transmit the processed metrology data to the utility provider.

Referring back to FIG. 7, at block 702, the network communication device 502 may run a first application in a first application space. The first application includes a metrology application, a monitoring application, a fraud detection application, a data analysis application, etc. The first application may be included in a first virtual meter running on the network communication device 502.

At block 704, the network communication device 502 may run a second application in a second application space. The second application space is isolated from the first application space. In one implementation, the second application may be included in a first virtual meter running on the network communication device 502. The second application may include an instance of an application that is the same as or different from the first application.

At block 706, the network communication device 502 may run a third application in a third application space. The third application space may be isolated from the first application space and the second application space. The third application may be a part of a second virtual meter running on the network communication device 502. The third application may include an instance of an application that is the same as or different from the first or second application. The first virtual meter and the second virtual meter may be isolated from each other.

At block 708, the network communication device 502 may assign a first group identifier to the first virtual meter and a first component identifier to data associated with each of the first and second applications of the first virtual meter.

At block 710, the network communication device 502 may assign a second group identifier to the second virtual meter and a second component identifier to data associated with the third application of the second virtual meter.

At block 712, the network communication device 502 may register or record the first group identifier and each first component identifier associated with the first virtual meter, and the second group identifier and each second component identifier associated with the second virtual meter in a common database.

At block 714, the network communication device 502 may upgrade the second virtual meter to a new virtual meter. The new virtual meter may be able to perform one or more operations on the data associated with the second virtual meter.

Any of the acts of any of the methods described herein may be implemented at least partially by a processor or other electronic device based on instructions stored on one or more processor-readable media. By way of example and not limitation, any of the acts of any of the methods described herein may be implemented under control of one or more processors configured with executable instructions that may be stored on one or more processor-readable media such as one or more computer storage media.

CONCLUSION

Although the invention has been described in language specific to structural features and/or methodological acts, it is to be understood that the invention is not necessarily limited to the specific features or acts described. Rather, the specific features and acts are disclosed as exemplary forms of implementing the invention.

What is claimed is:

1. A utility device comprising:
a processing unit;
memory; and
an instance of a virtual meter stored in the memory and executable by the processing unit, the instance of the virtual meter comprising a locked version of code that is unchangeable once stored in the memory and an unlocked version of code that is changeable once stored in the memory, wherein the instance of the virtual meter is configured to:
compare results of metrology data processed by the unlocked version of code with results of metrology data processed by the locked version of code; and
lock the unlocked version of the code to generate a second locked version of code in response to determining based on the comparison that the results of the metrology data processed by the unlocked version of code are within a predetermined threshold of error relative to the results of metrology data processed by the locked version of code.

2. The utility device as recited in claim 1, wherein the locked version of code comprises one or more functions and/or parameters used for processing metrology data.

3. The utility device as recited in claim 1, wherein the locked version of code comprises a version of the code that is approved by a governing body.

4. The utility device as recited in claim 1, wherein the unlocked version of code comprises code that is not yet approved by a governing body for processing metrology data associated with a site.

5. The utility device as recited in claim 1, the instance of the virtual meter further configured to replace the locked version of code with the second locked version of code in response to receiving an approval of the second locked version of code from a governing body.

6. The utility device as recited in claim 5, wherein the governing body comprises an authorized entity overseeing device requirements of the utility device in a country in which the utility device is to be installed.

7. The utility device as recited in claim 1, further comprising:
an operating system stored in the memory; and
a metrology driver in communication with the operating system, wherein the metrology driver is configured to provide metrology data to the locked version of code and the unlocked version of code.

8. The utility device as recited in claim 1, further comprising an instance of another virtual meter, wherein a memory space is designated to the instance of the virtual meter and is inaccessible by the other virtual meter.

9. The utility device as recited in claim 8, further comprising a common data store, the common data store storing data from the instance of the virtual meter and the instance of the other virtual meter.

10. The utility device as recited in claim 8, wherein the instance of the virtual meter and the instance of the other virtual meter are isolated from each other such that the instance of the virtual meter and the instance of the other virtual meter are unable to affect operations and data of each other.

11. A method comprising: under control of a processing unit of a utility computing device configured with executable instructions:
running a first application in a first application space, the first application comprising a metrology application;
running a second application in a second application space, which is isolated from the first application space, wherein the first application and the second application are included in a first virtual meter running on the utility computing device;
running a third application in a third application space, which is isolated from the first application space and the second application space, wherein the third application is a part of a second virtual meter running on the utility computing device, and wherein the first virtual meter is isolated from the second virtual meter;
assigning a first group identifier to the first virtual meter;
assigning a first component identifier to data associated with each of the first and second applications of the first virtual meter;
assigning a second group identifier to the second virtual meter; and
assigning a second component identifier to data associated with the third application of the second virtual meter.

12. The method as recited in claim 11, further comprising registering the first group identifier and each first component identifier associated with the first virtual meter and the second group identifier and the second component identifier associated with the second virtual meter in a common database.

13. The method as recited in claim 11, further comprising upgrading the second virtual meter to a new virtual meter, the new virtual meter being able to perform one or more operations on the data associated with the second virtual meter.

14. A utility meter comprising:
a processing unit;
memory;
an operating system stored in the memory and executable by the processing unit;
a metrology driver in communication with the operating system;
and an instance of a virtual meter, the instance of the virtual meter being configured to receive and process metrology data associated with a site from the metrology driver, wherein the instance of the virtual meter is configured to:
compare results of metrology data, received from the metrology driver and processed by an unlocked version of code, with results of metrology data processed by a locked version of code; and
lock the unlocked version of the code to generate a second locked version of code in response to determining based on the comparison that the results of the metrology data processed by the unlocked version of code are within a predetermined threshold of error relative to the results of metrology data processed by the locked version of code.

15. The utility meter as recited in claim 14, further comprising an instance of another virtual meter created from the metrology driver, the instance of the other virtual meter being configured to receive and process the metrology data associated with the site or metrology data associated with another site.

16. The utility meter as recited in claim 15, further comprising:
   a first memory space designated to the instance of the virtual meter; and
   a second memory space designated to the instance of the other virtual meter, wherein data in the first memory space is isolated from data in the second memory space.

17. The utility meter as recited in claim 16, wherein the locked version of the code includes data that are unchangeable once stored in the first memory space and the unlocked version of the code includes data that are changeable.

18. A method, comprising:
   operating a virtual meter in a memory by execution of a processing unit;
   executing a locked version of code of the virtual meter that is unchangeable within a first region of the memory;
   executing an unlocked version of code of the virtual meter that is changeable within a second region of the memory;
   comparing results of metrology data processed by the unlocked version of code with results of the metrology data processed by the locked version of code; and
   locking the unlocked version of the code to generate a second locked version of code in response to determining based on the comparison that the results of the metrology data processed by the unlocked version of code are within a predetermined threshold of error relative to the results of metrology data processed by the locked version of code.

\* \* \* \* \*